US006087828A

United States Patent [19]

Miwa

[11] Patent Number: 6,087,828

[45] Date of Patent: Jul. 11, 2000

[54] DISPLACEMENT DETECTION SENSOR USING MAGNETOSTRICTION

[75] Inventor: Moritaka Miwa, Obu, Japan

[73] Assignee: Aisin Seiki Kabushiki Kaisha, Aichi-pref., Japan

[21] Appl. No.: 09/033,641

[22] Filed: Mar. 3, 1998

[30] Foreign Application Priority Data

Mar. 3, 1997 [JP] Japan .................................... 9-047745

[51] Int. Cl.[7] ............................ G01B 7/14; G01F 23/30; H04R 15/00; G01D 5/48

[52] U.S. Cl. ............................... 324/207.13; 324/207.12; 324/207.24

[58] Field of Search ......................... 324/207.13, 207.24, 324/207.12, 235, 226; 73/290 V, 313, 314, 319; 333/148

[56] References Cited

U.S. PATENT DOCUMENTS 4,958,332 9/1990 Tellerman .......................... 324/207.13

FOREIGN PATENT DOCUMENTS 7-306030 11/1995 Japan .

*Primary Examiner*—Walter E. Snow

*Attorney, Agent, or Firm*—Reed Smith Hazel & Thomas LLP

[57] ABSTRACT

A displacement detection sensor includes a wire having one end portion and a second end portion, extending along a direction such that the second end portion is connected to a fixed position; a magnet generating a magnetic field therefrom, movable along the wire such that the wire is always being placed in the magnetic field and producing a twist in the wire when a current is supplied to the wire after a displacement of the magnet from its original to rest positions; a receiving device for receiving an elastic wave traveling directly to one end portion of the wire which is caused by the twist in the wire, the receiving device having a current induced thereat; an analyzing device for calculating the displacement on the basis of a time point at which the current is applied to the wire, and another time point at which the current is induced at the receiving device; and a tension device positioned at one end side of the wire for giving tension to the wire.

3 Claims, 5 Drawing Sheets

10
5
19
12
4
25
22
23
18
14
23
8
F
52
79
65

10f
60
NS
NS
6
10
5
Lo
L
77
75
70
19
4
18
8
52
65
79

10
5
19
4
22
25
18
28
52
12
23
23
8
14
79
F

DISPLACEMENT DETECTION SENSOR USING MAGNETOSTRICTION

BACKGROUND OF THE INVENTION

The present invention relates to a displacement detection sensor and in particular to a displacement detection sensor using magnetostriction.

One of the conventional displacement detection sensors is disclosed in Japanese Patent Laid-open Print No. Hei7(199 A.D.)-306030 published without examination. In the conventional sensor or device, a wire is connected at one end thereof to a fixed point. The other end of the wire is connected to another fixed point via an in-series provided coil spring. Thus, the wire under such a tension is extended in a direction defined by the two fixed points. The wire also passes through a ring magnet with a clearance which is secured to a body which is movable along the extending direction of the wire.

According to the well-known Wiedemann effect, when a current is applied to the wire placed in a magnetic field of the ring magnet, a twist is produced in the wire. The resultant twist occurs as an elastic wave which travels along the wire. At one side of the wire, the wire is surrounded by a solenoid connected to a microprocessor. When the elastic wave reaches a portion of the wire within the solenoid, a current is induced in the solenoid and such an induction is detected by the microprocessor.

In the foregoing sensor, the elastic wave travels at the speed of sound and therefore, when the current application is established, a first time point is noted. In addition, the induced detection is established at a second time point, and calculating the time duration between the two time points gives ultimately the displacement of the ring magnet.

However, due to the existence of the coil spring at the other end of the wire, the ring magnet fails to move along the fully extended length of the sensor per se. This means that to measure the full scope of the sensor enlargement of the sensor per se in its extension direction is not possible.

SUMMARY OF THE INVENTION

Therefore, one of the objects of the present invention is to provide a displacement detection sensor without the foregoing drawbacks.

Another object of the present invention is to provide a displacement detection sensor in which the conventional in-series coil spring is eliminated.

In order to attain the foregoing objects, a displacement detection sensor in accordance with the present invention includes:

a wire having one end portion and a second end portion, extending along a direction such that the second end portion is connected to a fixed position;

a magnet generating a magnetic field therefrom, movable along the wire such that the wire is always being placed in the magnetic field and producing a twist in the wire when a current is supplied to the wire after a displacement of the magnet from its original to rest positions;

receiving means for receiving an elastic wave traveling directly to one end portion of the wire which is caused by the twist in the wire, wherein the receiving means has a current induced thereat;

analyzing means for calculating the displacement on the basis of a time point at which the current is applied to the wire, and another time point at which the current is induced at the receiving means; and tension means positioned at one end side of the wire for giving tension to the wire.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

First Embodiment

Figure 1:
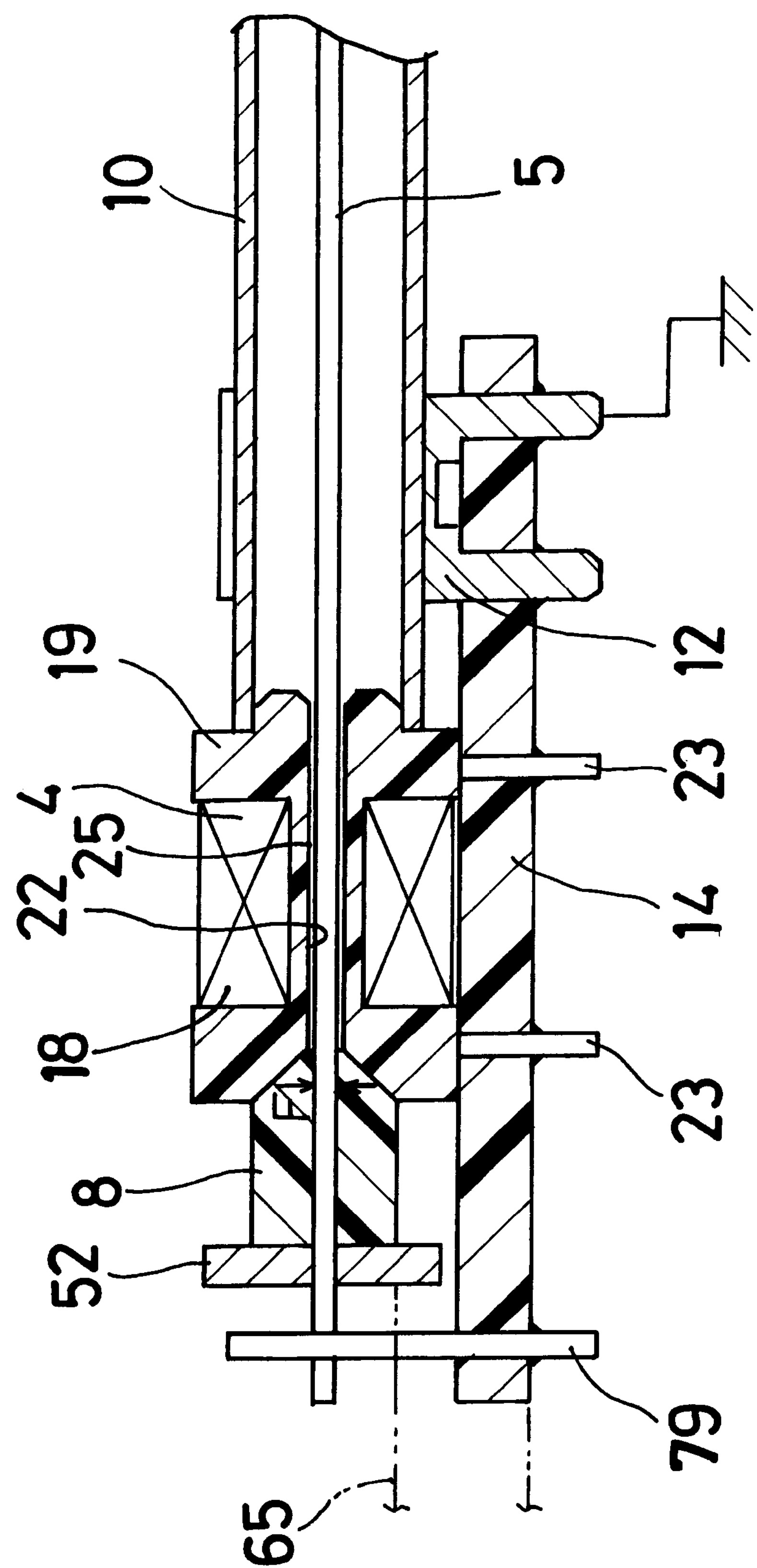
FIG. 1 shows an overall structure of a first embodiment of a displacement detection sensor in accordance with the present invention.
Figure 2:
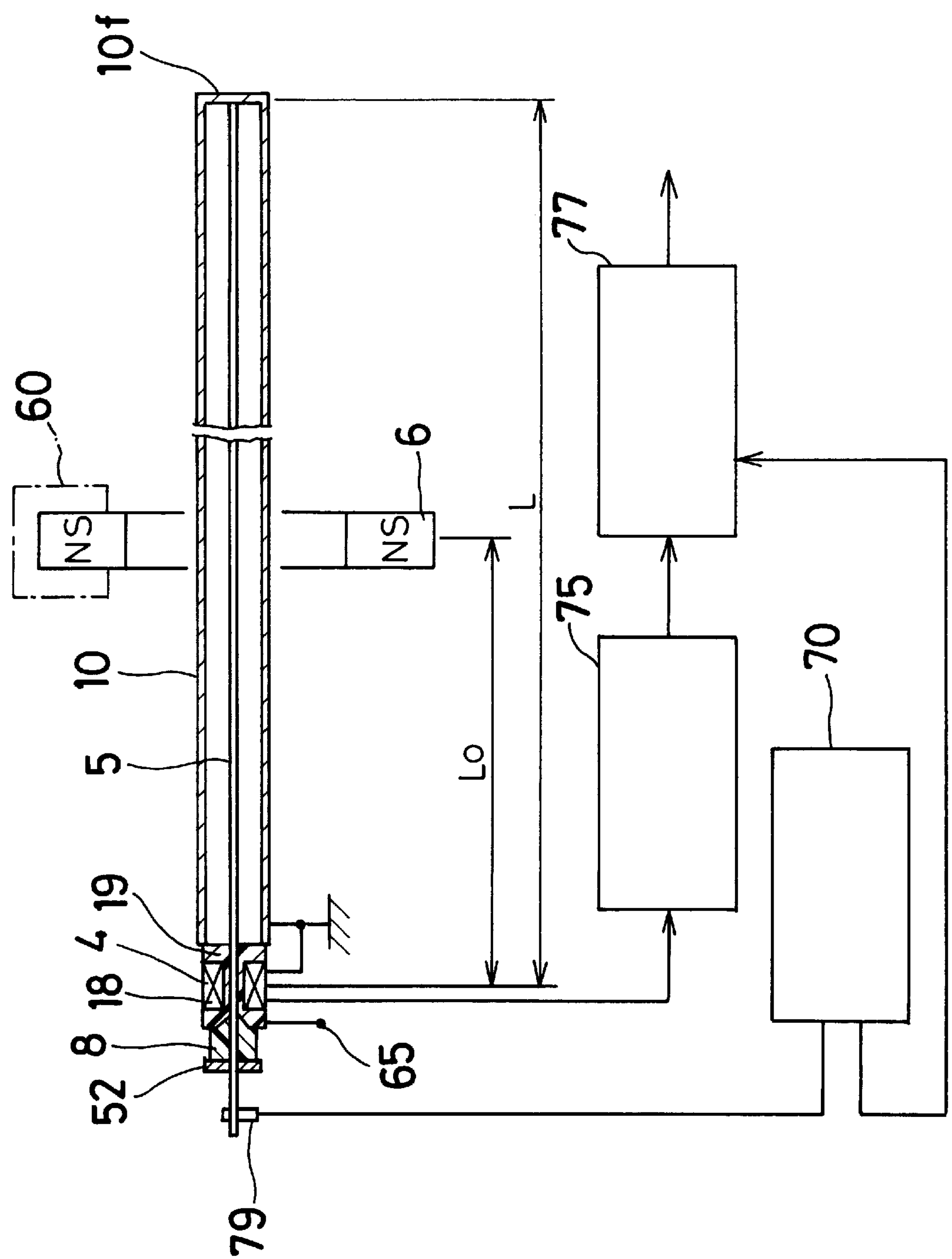
FIG. 2 is a cross-sectional view of a principal portion of the displacement detection sensor shown in FIG. 1.

Referring first to FIGS. 1 and 2, a displacement detection sensor in accordance with a first embodiment of the present invention includes a cylindrical base member 10 which is made of nonmagnetic material such as a brass or an alloy of aluminum. The cylindrical base member 10 is secured to a stationary portion 65 such as a vehicle body.

A right end portion of the cylindrical base member 10 is closed by a wall **10*f*, while a left end portion of the base member 10 which is in an open ended condition per se is snugly fitted with a right end portion of a bobbin 19 of a solenoid 18** which is made of an elastic material such as a synthetic resin.

The left end portion of the cylindrical base member 10 is supported by a ring portion of an earth electrode 12. The earth electrode 12 has four legs (only two are shown) which are fitted in a substrate 14 which is secured to the stationary portion 65. The legs are grounded. A coil 4 is wound around the bobbin 19 of the solenoid 18, and opposite terminals 23 and 23 of the coil 4 terminate in the substrate 14.

A wire 5 is extended in the cylindrical base member 10 and a right end of the wire 5 is secured to the wall **10*f* by means of soldering for example. Of course, other connecting means can be employed. The wire 5 is an elongated magnetostrictive material of a very small diameter such as a Ni—Fe family alloy. A left end portion of the wire 5 is connected by soldering to an upstanding electrode 79 on the substrate 14 after passing through an axial opening 22 of the bobbin 19 with a clearance 25**.

In the vicinity of the electrode 79, the wire 5 is fixedly mounted on an annular-shaped plate 52 as an engaging element by means of soldering or other suitable manner. Between the plate 52 and a left side of the bobbin 19, there is interposed an elastic member 8 under compression. A right side of the elastic member 8 has a frustum cone configuration, while a left side of the bobbin 19 is formed into a frustum cone shaped concave configuration.

Due to a restoration or recoil force of the elastic member 8 under compression, a force as a vertical force F appears as shown in FIG. 2 when the right side of the elastic member 8 is in taper-to-taper engagement with the left side of the bobbin 19, thereby establishing a tight connection between the elastic member 8 and the bobbin 19. Thus, a tension is being applied in the wire 5.

In the foregoing taper-to-taper engagement, in order to prevent an interface between the wire 5 and an outer periphery of the axial opening 22 of the bobbin 19, a virtual top end point of the frustum cone of the right end of the elastic member 8 is made to be on an axis of the axial opening 22 of the bobbin 19.

A ring-shaped permanent magnet 6 is mounted on the cylindrical base member 10 with a clearance therebetween. The magnet 6 is secured to a movable part of the vehicle such as a suspension 60 and is movable along the cylindrical base member 10. In the drawings, the magnet 6 is set to be movable between a starting point corresponding to the bobbin 19 and a terminating point corresponding to the wall **10*f* at the right end portion of the member 10**.

The displacement detection sensor also includes a microprocessor 77, a pulse supply circuit 70 and a wave-form shaping circuit 75. The latter two circuits are under the control of the microprocessor 77. Of course, the function of each of the circuits 70 and 75 can be performed by the microprocessor 77 subject to modifications of an operation or control program.

The microprocessor 77 includes a built-in timer (not shown) as well known. The timer is expected to clock in the order of microseconds. Of course, another timer circuit which is separated from the microprocessor 77 is used. In this case, such a timer can include a crystal oscillator.

Figure 4:
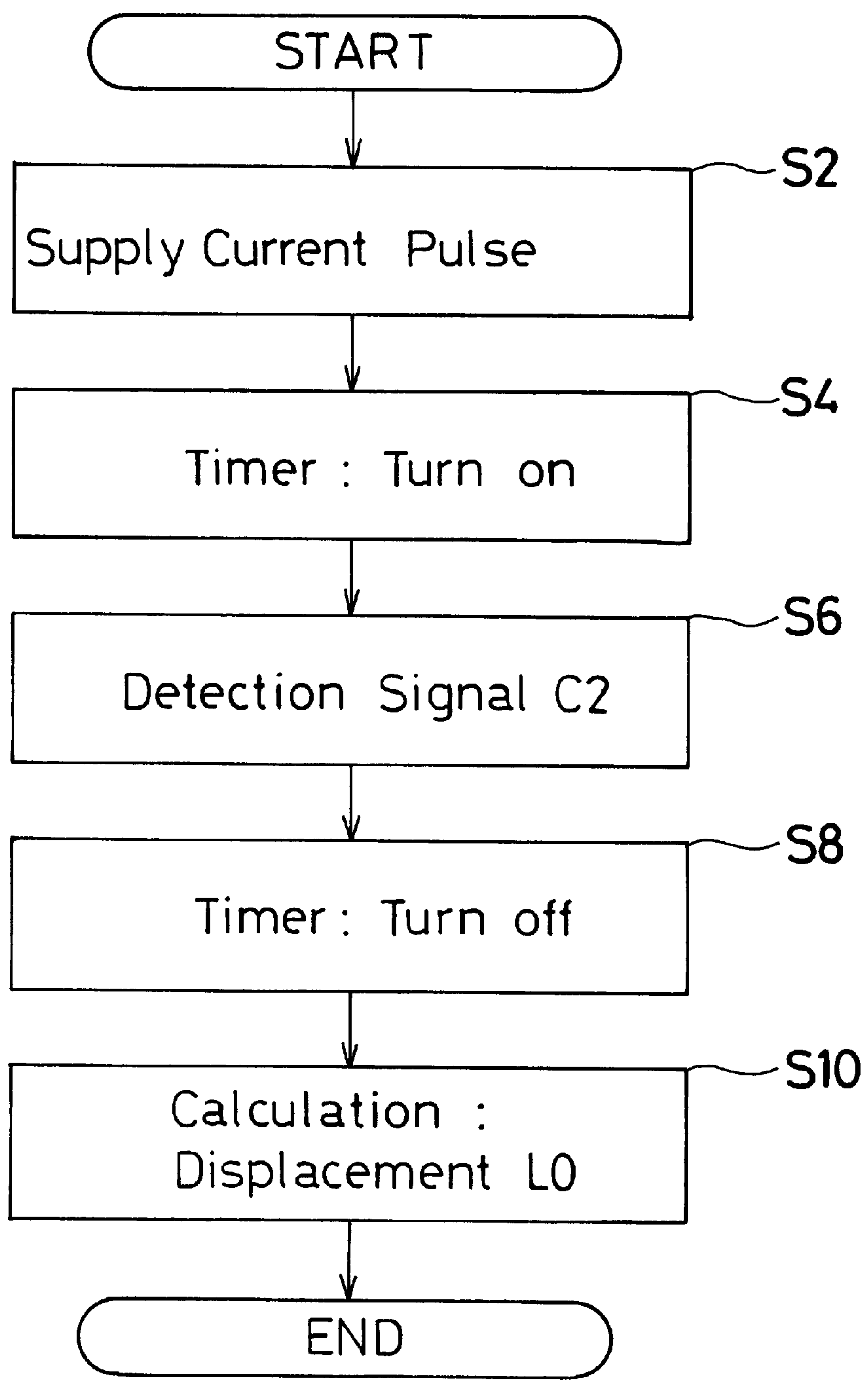
FIG. 4 shows a flowchart indicating an operation of the displacement detection sensor shown in FIG. 1.

Hereinafter, an overall operation of the displacement detection sensor will be explained in detail with reference to FIG. 4 in which a flowchart for a control program of the microprocessor 77 is depicted.

Figure 3:
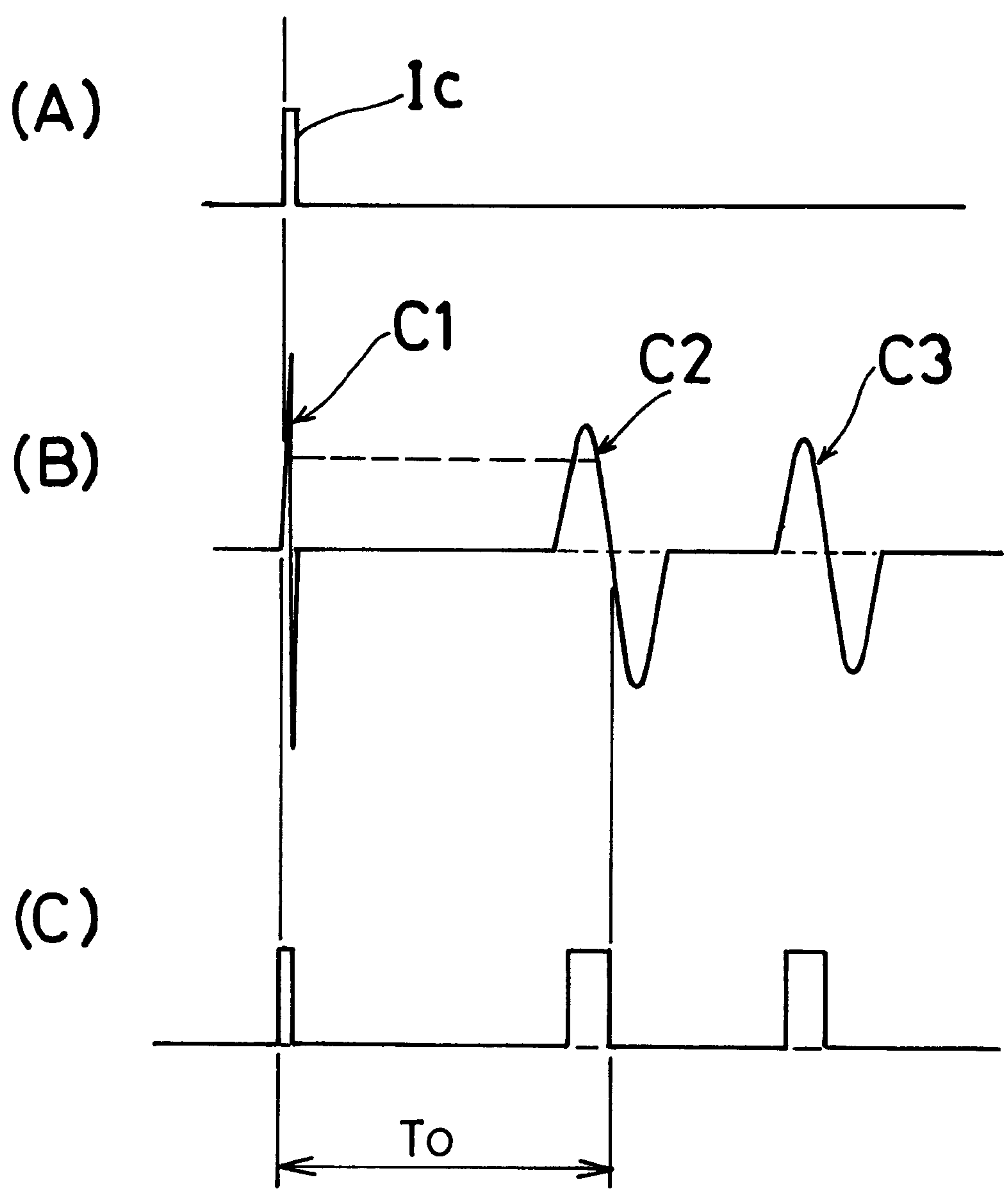
FIG. 3 shows each graph in which current signal is generated.

At step S2, the pulse supply circuit 77 supplies a current signal in the form of pulse waves as shown in FIG. 3(A) to the electrode 79. Then, the timer of the microprocessor 77 is turned on and begins to count time at step S4.

As soon as an establishment of a current-carrying condition of the wire 5 which is being placed in a magnetic field of the magnet 6, according to the well-known Wiedemann effect, a twist is produced in a portion of the wire 5 to which the instant position of the magnet 6 corresponds. The resultant twist occurs as an elastic wave which travels along the wire 5. The elastic wave is, as a whole, divided into a direct elastic wave which goes to the leftward and an indirect elastic wave which goes to the rightward initially and turns to the rightward after reflection at the wall **10*f***.

Immediately when the direct elastic wave reaches the bobbin 19 of the solenoid 18, a current is induced whose shape is indicated with 'C2' in FIG. 3(B) and the resultant current is fed to the microprocessor 77 after being formed into a rectangular wave shown in FIG. 3(C) in the wave shaping circuit 75.

Upon receipt of the induced current at the microprocessor 77 which is detected at step S6, the timer is turned off at step SB. It is to be noted that the arrival of the current to the microprocessor 77 and the detection of the current induction at the solenoid 28 occurs substantially at the same time. Thus, one can be regarded as the other in practical use, or vice versa.

A time duration T0 is the time between the current application to the wire 5 and the detection of the induction of the current at the solenoid 18. A length or displacement L0 between the instant position of the magnet 6 and the solenoid 18 can be expressed as an equation of $L0=V\times T0$ where V is the sound speed. The calculation of the displacement L0 relying on this equation is made at step S10.

The calculated displacement L0, when it indicates a vehicle height change, is used as a parameter to be processed in another microprocessor (not shown) which is a component of a suspension control system (not shown).

It is to be noted that though the direct elastic wave goes furthermore to the rightward after inducing the current at the solenoid, such a direct elastic wave is damped in the elastic member B. Even though the damping is inefficient, the leftward moving direct elastic wave is again damped at the elastic member 8 after being reflected at the electrode 77.

The indirect elastic wave, which is expected to arrive at the elastic member 8 behind the arrival of the direct elastic wave, is also damped in the elastic member 8 twice after passing through the solenoid 18. This means that an earlier arrival of the next direct elastic wave at the solenoid 18 can be established if the calculation of the displacement of the magnet 6 is required in a real time manner. The reason is that no factors exist which disturb a timely arrival of the next direct elastic wave.

In the foregoing structure, a full extension length of the wire 5 serves for the movement of the magnet 6.

Second Embodiment

Figure 5:
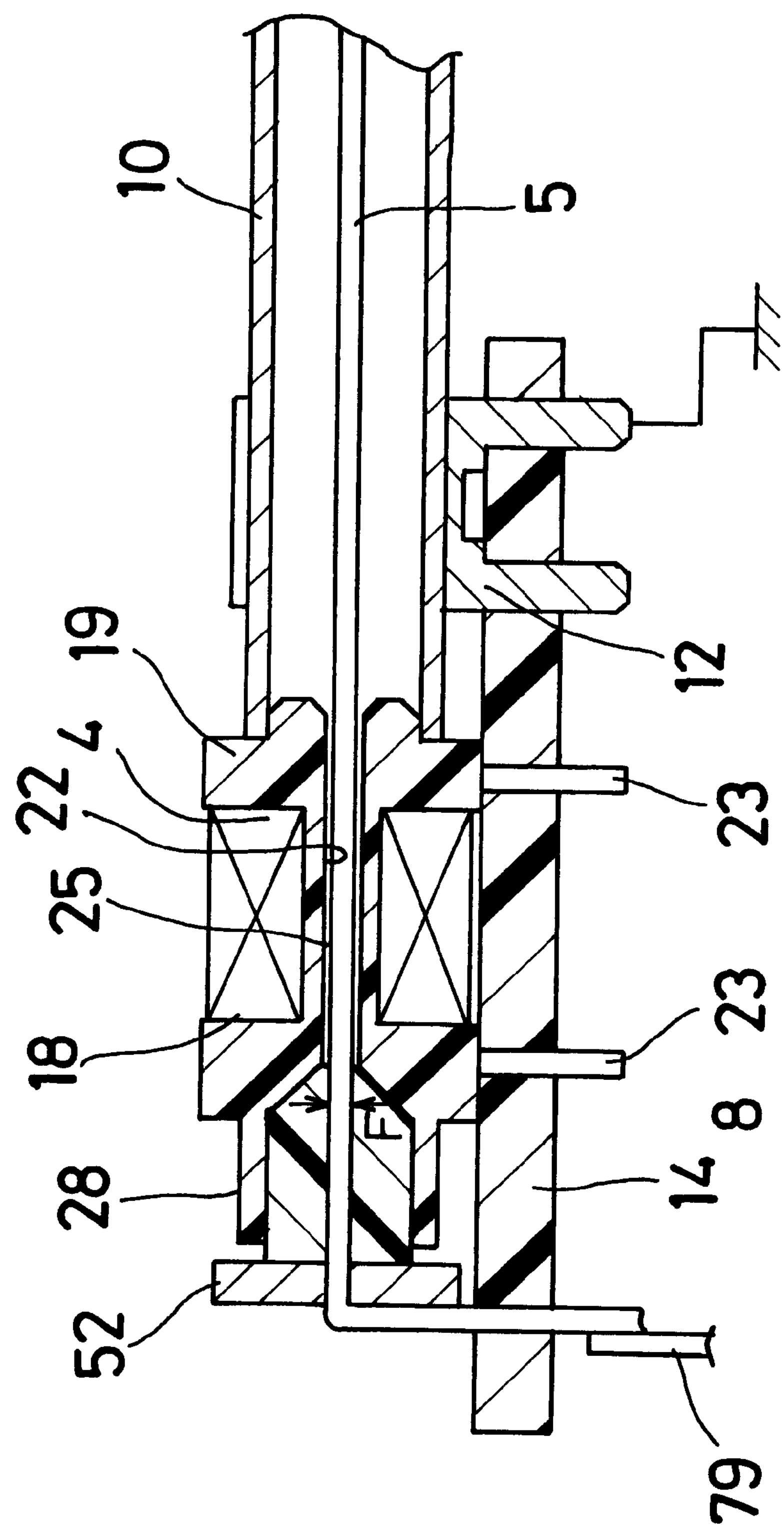
FIG. 5 is a cross-sectional view of a principal portion of a second embodiment of a displacement detection sensor in accordance with the present invention.

In FIG. 5, there is illustrated a structure similar to that shown in FIG. 2, except for the following two items (1) and (2).

(1) In the present embodiment, one end portion of the wire 5 is bent downwardly and terminated at a junction thereof with the electrode 79 below the substrate 14. In such a structure, no soldering is required on the substrate 14.

(2) In the present embodiment, the elastic member 8 is accommodated in a sleeve portion 28 which extends integrally from the left side of the bobbin 19 toward one end portion of the wire 5. Such a structure prevents an excess restoration of the elastic member 8 outwardly in the radial direction, thereby assuring the taper-to-taper engagement of the right side of the elastic member 8 with the left side of the bobbin 19.

The invention has thus been shown and described with reference to specific embodiments; however, it should be understood that the invention is in no way limited to the details of the illustrated structures but changes and modifications may be made without departing from the spirit and scope of the appended claims.

What is claimed is:

1. A displacement sensor comprising:

a wire having one end portion and a second end portion, extending along a direction such that the second end portion is connected to a fixed position, the wire being composed of magnetostrictive material;

a magnet generating a magnetic field therefrom, movable along the wire such that the wire is always being placed in the magnetic field and producing a twist in the wire when a current is supplied to the wire after a displacement of the magnet from its original to rest positions;

receiving means for receiving an elastic wave traveling directly to one end portion of the wire which is caused by the twist in the wire, wherein the receiving means has a current induced thereat;

analyzing means for calculating the displacement on the basis of a time point at which the current is applied to the wire, and another time point at which the current is induced at the receiving means; and a tension means positioned at one end side of the wire for giving tension to the wire, and for damping the elastic wave transmitted through the wire, wherein the tension means has a plate fixed on the wire and an elastic member compressed between the plate and one end of the receiving means, wherein the elastic member is in taper-to-taper elastic engagement with one end portion of the receiving means.

2. A displacement detection sensor comprising:

a wire having one end portion and a second end portion, extending along a direction such that the second end portion is connected to a fixed position, the wire being composed of magnetostrictive material;

a magnet generating a magnetic field therefrom, movable along the wire such that the wire is always being placed in the magnetic field and producing a twist in the wire when a current is supplied to the wire after a displacement of the magnet from its original to rest positions;

receiving means for receiving an elastic wave traveling directly to one end portion of the wire which is caused by the twist in the wire, wherein the receiving means has a current induced thereat;

analyzing means for calculating the displacement on the basis of a time point at which the current is applied to the wire, and another time point at which the current is induced at the receiving means; and a tension means positioned at one end side of the wire for giving tension to the wire, and for damping the elastic wave transmitted through the wire, the tension means having a plate fixed on the wire and an elastic member compressed between the plate and one end of the receiving means.

3. A displacement detection sensor as set forth in claim 1, wherein the analyzing means includes a microprocessor and calculates the displacement in plural times at very short intervals.

* * * * *